(12) United States Patent
Fotland et al.

(10) Patent No.: US 10,297,210 B2
(45) Date of Patent: May 21, 2019

(54) E-PAPER IMAGING VIA ADDRESSABLE ELECTRODE ARRAY

(71) Applicant: HEWLETT-PACKARD DEVELOPMENT COMPANY, L.P., Houston, TX (US)

(72) Inventors: Richard A. Fotland, Palo Alto, CA (US); Napoleon J. Leoni, Palo Alto, CA (US); Omer Gila, Palo Alto, CA (US); William D. Holland, Palo Alto, CA (US); Henryk Birecki, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/211,407

(22) Filed: Dec. 6, 2018

(65) Prior Publication Data
US 2019/0108800 A1  Apr. 11, 2019

Related U.S. Application Data

(63) Continuation of application No. 15/114,415, filed as application No. PCT/US2014/014335 on Jan. 31, 2014, now Pat. No. 10,152,927.

(51) Int. Cl.
| | | |
|---|---|---|
| G09G 3/34 | (2006.01) | |
| G06F 3/03 | (2006.01) | |
| G02F 1/1333 | (2006.01) | |
| G02F 1/167 | (2006.01) | |

(52) U.S. Cl.
CPC ..... *G09G 3/3446* (2013.01); *G02F 1/133348* (2013.01); *G02F 1/167* (2013.01); *G06F 3/0304* (2013.01)

(58) Field of Classification Search
CPC . G09G 3/3446; G02F 1/167; G02F 1/133348; G06F 3/0304
See application file for complete search history.

(56) References Cited

U.S. PATENT DOCUMENTS

| | | |
|---|---|---|
| 4,155,093 A | 5/1979 | Fotland |
| 4,160,257 A | 7/1979 | Carrish |
| 4,679,060 A | 7/1987 | McCallum |
| 4,899,186 A | 2/1990 | Walcott |
| 5,014,076 A | 5/1991 | Caley |

(Continued)

FOREIGN PATENT DOCUMENTS

| | | |
|---|---|---|
| JP | 2009165226 | 7/2009 |
| KR | 20100120589 | 11/2010 |
| WO | WO-2013058757 | 4/2013 |

OTHER PUBLICATIONS

Equivalent Circuit of Ion Projection-Driven Electrophoretic Display Masanori Yamaguchi Hiroshi Matsuoka Jun Matsuzawa Publication IEICE Transactions on Electronics vol. E74-C No. 12 pp. 4152-4156.

(Continued)

*Primary Examiner* — Aneeta Yodichkas
(74) *Attorney, Agent, or Firm* — Dicke Billig & Czaja PLLC

(57) ABSTRACT

An e-paper imaging system includes a writing unit and a support surface to support a passive e-paper media in a position spaced apart from the writing unit. The writing unit includes a charge generator and an electrode array. The electrode array includes addressable holes to control charges flowing to the support surface.

20 Claims, 11 Drawing Sheets

(56) References Cited

U.S. PATENT DOCUMENTS

| | | |
|---|---|---|
| 5,027,136 A | 6/1991 | Fotland |
| 5,257,045 A | 10/1993 | Bergen et al. |
| 5,866,284 A | 2/1999 | Vincent |
| 6,127,775 A | 10/2000 | Bergen |
| 6,333,754 B1 | 12/2001 | Oba |
| 6,426,552 B1 | 7/2002 | Reeder |
| 6,515,790 B2 | 2/2003 | Miyamoto et al. |
| 6,753,999 B2 | 6/2004 | Zehner |
| 6,982,734 B2 | 1/2006 | Pan |
| 7,140,550 B2 | 11/2006 | Ramachandran |
| 7,580,845 B2 | 8/2009 | Burman et al. |
| 7,789,489 B2 | 9/2010 | Matsuzoe |
| 8,018,410 B2 | 9/2011 | Schmitz |
| 8,144,388 B2 | 3/2012 | Ogawa |
| 8,514,256 B2 | 8/2013 | Ogawa et al. |
| 2002/0009655 A1 | 1/2002 | Miyamoto et al. |
| 2003/0067427 A1 | 4/2003 | Comiskey et al. |
| 2005/0073571 A1 | 4/2005 | Pan et al. |
| 2005/0134550 A1 | 6/2005 | Schmitz |
| 2006/0017659 A1 | 1/2006 | Ogawa et al. |
| 2007/0045399 A1 | 3/2007 | Martin |
| 2008/0180510 A1 | 7/2008 | Fotland |
| 2008/0297878 A1 | 12/2008 | Brown |
| 2011/0187798 A1 | 8/2011 | Rogers et al. |
| 2011/0254431 A1 | 10/2011 | Hirakawa |
| 2011/0298760 A1 | 12/2011 | Gila |
| 2012/0169823 A1 | 7/2012 | Leoni |
| 2012/0206341 A1 | 8/2012 | Gila et al. |
| 2012/0249711 A1 | 10/2012 | Tamoto |
| 2012/0320001 A1 | 12/2012 | Gila |
| 2013/0003162 A1 | 1/2013 | Leoni |
| 2013/0114124 A1 | 5/2013 | Suwald |
| 2013/0235446 A1 | 9/2013 | Leoni et al. |
| 2014/0210805 A1 | 7/2014 | Birecki et al. |
| 2014/0239068 A1 | 8/2014 | Park |
| 2014/0253426 A1 | 9/2014 | Leoni et al. |

OTHER PUBLICATIONS

Kleper, The Generation Beyond Print-on-Paper, Rochester Institute of Technology, 2002, 72 pages.

E-PAPER IMAGING VIA ADDRESSABLE ELECTRODE ARRAY

CROSS-REFERENCE

This Application is a Continuation of U.S. patent application Ser. No. 15/114,415, filed Jul. 27, 2016, entitled "E-PAPER IMAGING VIA ADDRESSABLE ELECTRODE ARRAY", which claims benefit to PCT/US2014/014335, filed Jan. 31, 2014, entitled "E-PAPER IMAGING VIA ADDRESSABLE ELECTRODE ARRAY", both of which are incorporated herein by reference.

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

DETAILED DESCRIPTION

Figure 1:
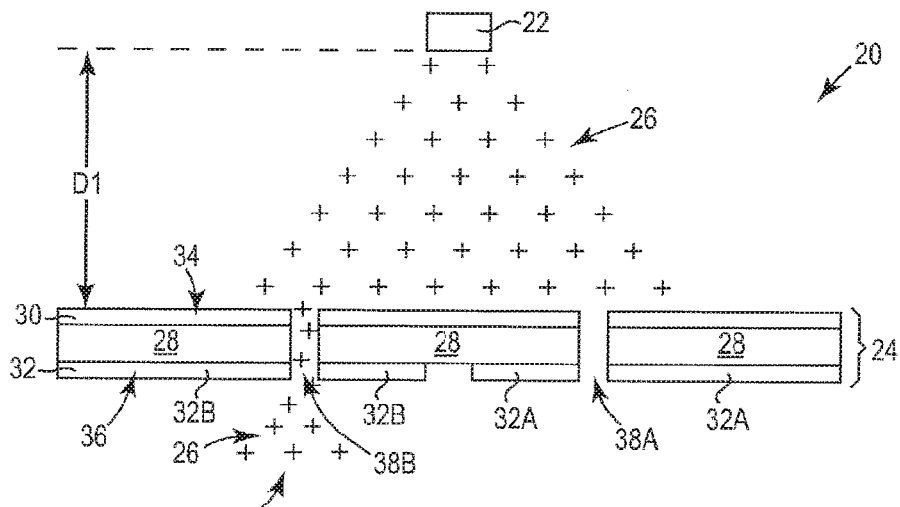
FIG. 1 is a diagram including a side sectional view schematically illustrating an imaging unit for writing a marking material, according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

At least some examples of the present disclosure are directed to imaging via non-contact application of charges onto a spaced apart, passive e-paper media. In one aspect, this arrangement provides high enough resolution to achieve rapid, quality imaging on e-paper media. In at least some examples of the present disclosure, an e-paper imaging system includes an imaging unit and a support surface to support a passive e-paper media in a position spaced apart from the imaging unit to receive airborne charges from the imaging unit. In one example, the imaging unit includes a charge generator and an electrode array. The electrode array includes nozzles extending through a dielectric material, wherein the nozzles are individually addressable to separately control charges from the charge generator. In one aspect, the electrode array does not intentionally store charges and does not generate or otherwise intentionally retain charges. However, it will be understood that some minimal charges may unintentionally be present at or near a dielectric layer within the electrode array.

In one aspect, by controlling an on/off state of nozzles of the electrode array, the nozzles act as gates to block or enable passage of charges through the nozzles.

In one aspect, the e-paper media is passive in the sense that it is re-writable and holds an image without being connected to an active power source during the writing process and/or after the writing is completed. In another aspect, the e-paper media lacks internal circuitry, does not have an internal power supply, and does not connect to an external power supply.

In at least some examples, the e-paper media includes a charge-responsive layer that includes components that switch colors when a field or charges are applied to it. In some examples, the e-paper includes the charge-responsive layer and a conductive layer that serves as a counter-electrode on one side of the e-paper. In some examples, the color-switching components within the charge-responsive layer include pigment/dye elements, which are contained in microcapsules present in a resin/polymer material. In some examples, an additional functional coating is included on top of the charge-responsive layer.

In some examples, the electrode array comprises a two-dimensional array of individually addressable nozzles to provide high speed directing of charges while the various nozzles are strategically patterned (e.g. location and spacing) to prevent unwanted charge deposition patterns on the imaging substrate (e.g. e-paper media) that would otherwise hamper quality imaging. In some examples, the charge generator includes a plurality of corona wire elements for use in association with the strategically patterned, addressable holes (i.e. nozzles) to ensure a generally uniform supply of charges to the addressable holes of the electrode array while still minimizing unwanted charge deposition patterns on the imaging substrate (i.e. passive e-paper display).

These examples, and additional examples, are described throughout the present disclosure and in association with at least FIGS. 1-12.

FIG. 1 is a diagram schematically illustrating, in one example of the present disclosure, an imaging unit 20 that can be used to write a marking material, such as e-paper. Imaging unit 20 includes a device 22 that generates charges and an electrode grid array 24. The term "charges" as used herein refers to ions (+/−) or free electrons and in FIG. 1 device 22 generates positive charges 26. Electrode array 24 is held in spaced apart relation to device 22 by a distance D1. In one example, device 22 is a corona generating device, such as a thin wire that is less than 100 micrometers in diameter and operating above its corona generating potential. In some examples, while not shown in FIG. 1, device 22 generates negative charges that move under existing electrical fields.

In some examples, electrode array 24 includes a dielectric film 28, a first electrode layer 30, and a second electrode layer 32. Dielectric film 28 has a first side 34 and a second side 36 that is opposite first side 34. Dielectric film 28 has holes or nozzles 38a and 38b that extend through dielectric film 28 from first side 34 to second side 36. In one example, each of the holes 38a and 38b is individually addressable to control the flow of electrons through each of the holes 38a and 38b separately.

First electrode layer 30 is on first side 34 of dielectric film 28 and second electrode layer 32 is on second side 36 of dielectric film 28. First electrode layer 30 is formed around the circumferences of holes 38a and 38b to surround holes 38a and 38b on first side 34. Second electrode layer 32 is formed into separate electrodes 32a and 32b, where electrode 32a is formed around the circumference of hole 38a to surround hole 38a on second side 36 and electrode 32b is formed around the circumference of hole 38b to surround hole 38b on second side 36.

In operation, an electrical potential between first electrode layer 30 and second electrode layer 32 controls the flow of charges 26 from device 22 through holes 38 in dielectric film 28. In one example, electrode 32a is at a higher electrical potential than first electrode layer 30 and the positive charges 26 are prevented or blocked from flowing through hole 38a. In one example, electrode 32b is at a lower electrical potential than first electrode layer 30 and the positive charges 26 flow through hole 38b to a collector (not shown).

Figure 2:
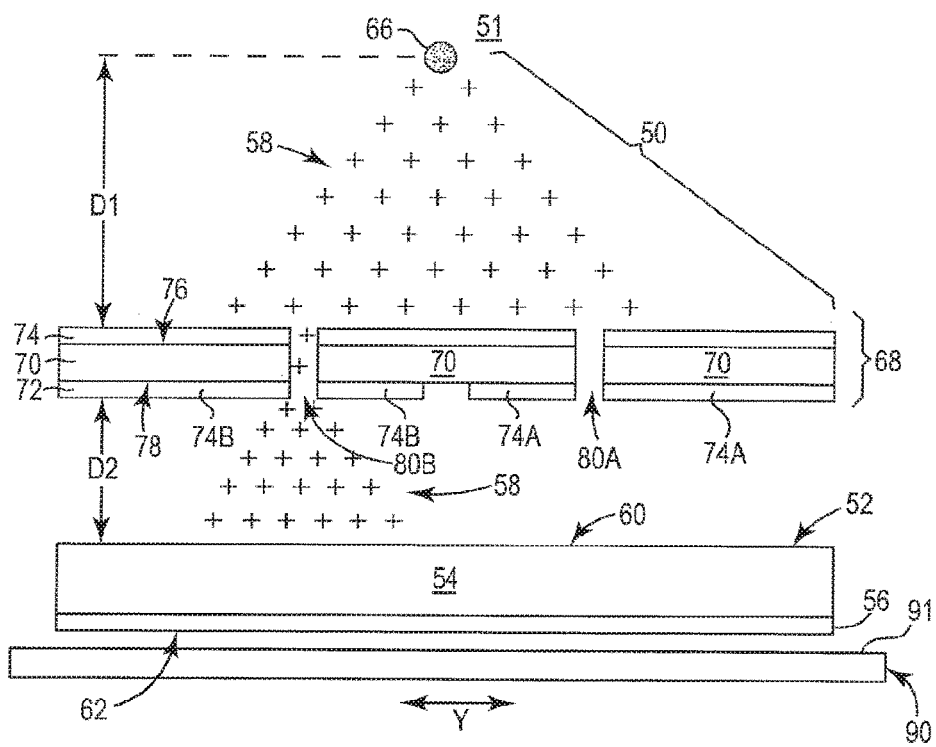
FIG. 2 is a diagram including a side sectional view illustrating an addressable imaging unit for imaging e-paper, according to one example of the present disclosure.

FIG. 2 is a diagram schematically illustrating, in one example of the present disclosure, an imaging system 51 including an addressable corona imaging unit 50 that writes e-paper 52. Imaging unit 50 images digital media on e-paper 52 using positive or negative charges. E-paper 52 is bi-stable, such that a collection of light absorbing and light reflecting states across e-paper 52 remains until sufficient charges or electrical fields are applied to e-paper 52. In one example e-paper 52 is a passive e-paper that does not include electronics for changing the state of the e-paper.

In general terms, imaging unit 50 is held in spaced apart relation to e-paper 52 a distance D2. In particular, as further shown in FIG. 2, in some examples the imaging system 51 includes a support 90 to releasably support e-paper 52 (at least during relative motion between imaging unit 50 and e-paper 52) to enable e-paper 52 to position e-paper 52 to receive charge directed through holes 80A, 80B of imaging unit 50. In one aspect, support 90 is arranged as part of a positioning mechanism that controls relative movement between imaging unit 50 and support 90, as represented via directional arrow Y. In another aspect, a top surface 91 of support 90 is spaced from bottom surface of the electrode array (i.e. the location of holes 80A, 80B) by a distance D2.

In one example, e-paper 52 includes charge-responsive layer 54 and a counter electrode layer 56. Charge-responsive layer 54 includes charged color components that switch colors when charges 58 are applied to the imaging surface 60 of e-paper 52. Counter electrode layer 56 is a conductive layer secured to charge-responsive layer 54 and is the non-imaging surface 62 of e-paper 52, which is opposite imaging surface 60 of e-paper 52. In some examples, an additional coating is included on charge-responsive layer 54 and this additional coating comprises an imaging surface 60 of e-paper 52. In one example, the color-switchable components of charge-responsive layer 54 include pigment/dye elements with a resin or polymer encapsulating microcapsules containing the color-switchable components of charge-responsive layer 54. With further reference to FIG. 2, in some examples, imaging unit 50 includes a corona generating device 66 that generates charges and a non-charge generating addressable electrode grid array 68. In FIG. 2, corona generating device 66 generates positive charges 58, however, in some examples corona generating device 66 can generate positive or negative charges. Non-charge generating addressable electrode array 68 is held in spaced apart relation to corona generating device 66 by a distance D1. In one example, corona generating device 66 is a thin wire that is less than 100 micrometers in diameter and operating above its corona generating potential, such as above 3 kilovolts. In one example, corona generating device 66 is a thin wire, such as a 70 micrometer diameter tungsten wire coated with gold.

Non-charge generating addressable electrode array 68 provides spatially varying electric potential along the length of corona generating device 66 to selectively block or allow charges 58 to pass through addressable electrode array 68. The addressable electrode array 68 provides for temporal and spatial control of charges 58 onto e-paper 52.

Electrode array 68 includes a dielectric film 70, a first electrode layer 72, and a second electrode layer 74. Dielectric film 70 has a first side 76 and a second side 78 that is opposite first side 76. Dielectric film 70 has holes or nozzles 80a and 80b that extend through dielectric film 70 from first side 76 to second side 78. Each of the holes 80a and 80b is individually addressable to control the flow of electrons through each of the holes 80a and 80b separately.

First electrode layer 72 is on first side 76 of dielectric film 70 and second electrode layer 74 is on second side 78 of dielectric layer 70. First electrode layer 72 is formed around the circumferences of holes 80a and 80b to surround holes 80a and 80b on first side 76. Second electrode layer 74 is formed into separate electrodes 74a and 74b, where electrode 74a is formed around the circumference of hole 80a to surround hole 80a on second side 78 and electrode 74b is formed around the circumference of hole 80b to surround hole 80b on second side 78.

In operation, addressable corona generator 66 of imaging unit 50 generates charges 58 that drift toward addressable electrode array 68 and then travel through the air for deposit onto e-paper 52 to selectively switch the optical state of the pigment/dye in e-paper 52. Imaging surface 60 of e-paper 52 is opposite conductive counter electrode 56 and a ground return path connected to counter electrode 56 provides a path for counter charges to flow to counter electrode 56, which keeps e-paper 52 substantially charge neutral in spite of charges 58 on imaging surface 60. In one example, counter electrode 56 is at ground. In some examples, counter electrode 56 is at any suitable reference potential to provide the fields suitable to extract charges 58 from corona generating device 66.

Electric potential between first electrode layer 72 and second electrode layer 74 controls the flow of charges 58 from corona generating device 66 through holes 80A, 80B in dielectric film 70. In one example, electrode 74A is at a higher electrical potential than first electrode layer 70 and the positive charges 58 are prevented or blocked from flowing through hole 80A. In one example, electrode 74B is at a lower electrical potential than first electrode layer 72 and the positive charges 58 flow through hole 80B to e-paper 52.

Figure 3A:
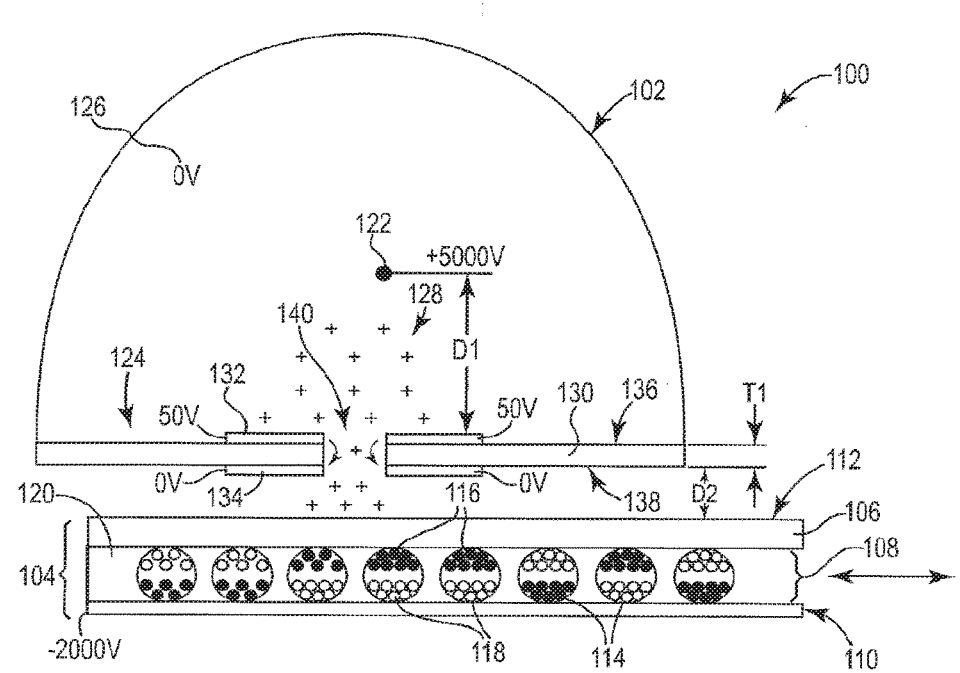
FIG. 3A is a diagram illustrating the operation of an imaging system in the "on" state, according to one example of the present disclosure.
Figure 3B:
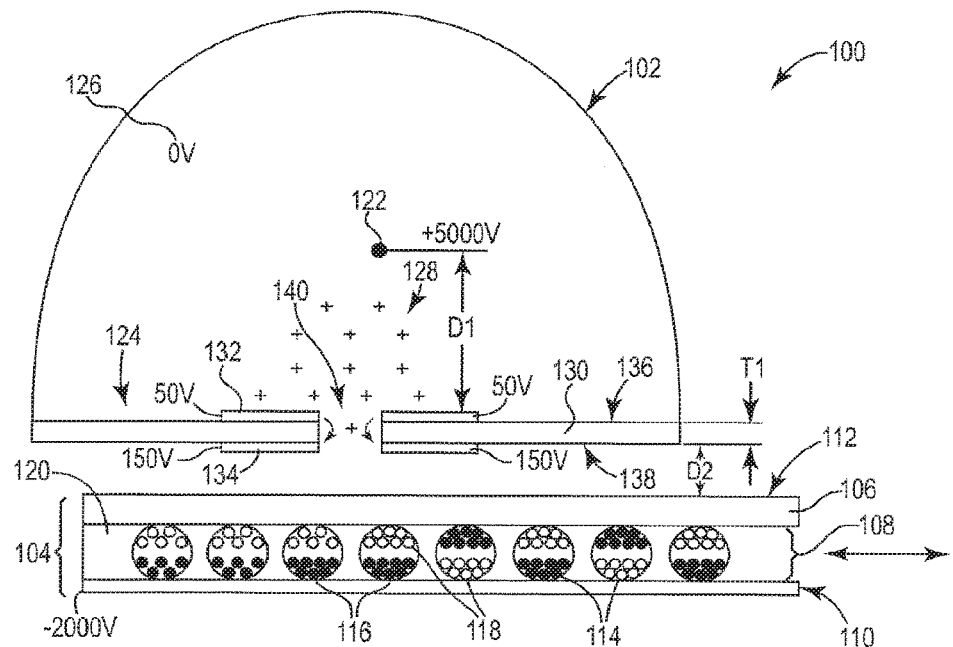
FIG. 3B is a diagram illustrating the operation of an imaging system in the "off" state, according to one example of the present disclosure.

FIGS. 3A and 3B are diagrams including a side sectional view schematically illustrating the operation of an imaging system 100, according to one example of the present disclosure, which includes an addressable corona imaging unit 102 and e-paper 104. Imaging unit 102 is held in spaced apart relation to e-paper 104 a distance D2 with e-paper 104 and imaging unit 102 arranged for relative movement with respect to each other such that imaging unit 102 images digital media images onto e-paper 104. While not shown in FIGS. 3A, 3B, it will be understood that in some examples, e-paper 104 is releasably supported by support 90, as in FIG. 2 with support 90 maintaining the spaced apart distance D2.

With this arrangement, imaging unit 102 controls the temporal and spatial transference of positive charges onto e-paper 104 to provide digital media images on e-paper 104. E-paper 104 is bi-stable, such that e-paper 104 retains the images until sufficient charges or electrical fields are applied to erase the images. In one example e-paper 104 is passive e-paper that does not include electronics for changing the state of the e-paper. In one example distance D2 is 0.5 millimeters.

It will be understood that while FIGS. 3A, 3B show just one hole 140, these Figures are representative of the operation of an electrode array having many such holes, with each hole being individually controllable in an "on" or "off" state.

In some examples, e-paper 104 includes a functional coating layer 106, a charge-responsive layer 108, and a counter electrode layer 110. Functional coating layer 106 is situated on one side of charge-responsive layer 108 and includes imaging surface 112. In some examples, charged components within charge-responsive layer 108 switch color when charges are applied to imaging surface 112. Counter electrode layer 110 is a conductive layer on another side of charge-responsive layer 108, opposite functional coating layer 106. In one aspect, counter electrode layer 110 is the non-imaging surface of e-paper 104, which is opposite imaging surface 112.

In some examples, charge-responsive layer 108 includes capsules 114 containing a dispersion of charged color particles (e.g. pigment or dye) in dielectric oils. This dispersion of charged color particles includes black or dark, light absorbing, particles 116 and white, light reflecting, particles 118. A resin or polymer binder 120 encapsulates pigment capsules 114 of charge-responsive layer 108. In one example, black particles 116 drift toward functional coating layer 106 and white particles 118 drift toward counter electrode layer 110 after positive charges are placed on imaging surface 112. In one example, white particles 118 drift toward functional coating layer 106 and black particles 116 drift toward counter electrode layer 110 after positive charges are placed on imaging surface 112. It will be understood that an alternate paradigm is employable in which black particles 116 drift toward electrode layer 110 and white particles 118 drift toward functional coating layer 106 after positive charges are placed on imaging surface 112.

In some examples, e-paper 104 is constructed differently, such as by the use of celled structures between walls or air borne particles in capsules.

In some examples, addressable imaging unit 102 generates positive charges that are selectively applied to imaging surface 112 to image digital media images on e-paper 104. A ground return path connected to counter electrode layer 110 provides a path for counter charges to flow to counter electrode layer 110, which keeps e-paper 104 substantially charge neutral in spite of the positive charges placed on imaging surface 112. Counter electrode layer 110 is at any suitable reference potential to provide the appropriate fields to extract positive charges from addressable corona imaging unit 102.

In some examples, imaging unit 102 includes a corona wire 122, an addressable electrode grid array 124, and a housing 126. Electrode array 124 is held in spaced apart relation to corona wire 122 by a distance D1 and corona wire 122 operates at 5000 volts to generate positive charges 128. In one example, corona wire 122 is 70 micrometers in diameter. In one example, corona wire 122 is a tungsten wire coated with gold. In one example, distance D1 is 1.5 millimeters.

Electrode array 124 provides temporally and spatially varying electric potential along the length of corona wire 122 to selectively block or allow charges 128 to pass through electrode array 124 and onto e-paper 104.

In some examples, addressable electrode array 124 includes dielectric material 130, a first electrode layer 132, and a second electrode layer 134. Dielectric material 130 has a thickness T1 and a first side 136 and an opposite second side 138. Dielectric material 130 has a hole or nozzle 140 that extends through dielectric material 130 from first side 136 to second side 138. In one example, thickness T1 is 50 micrometers.

First electrode layer 132 is on first side 136 and second electrode layer 134 is on second side 138. First electrode layer 132 is formed around the circumferences of hole 140 to surround hole 140 on first side 136 and second electrode layer 134 is formed around the circumference of hole 140 on second side 138.

FIG. 3A is a diagram schematically illustrating, in one example of the present disclosure, the operation of imaging system 100 in the "on" state, where positive charges 128 are transferred from imaging unit 102 to imaging surface 112, which is sometimes referred to as the collector electrode. In some examples, corona wire 122 is held at 5000 volts to generate positive charges 128 and housing 126 is held at 0 volts (ground). First electrode layer 132 is held at 50 volts and positive charges 128 drift from corona wire 122 to electrode array 124 and first electrode layer 132. Second electrode layer 134 is switched to and held at 0 volts and positive charges 128 pass through hole 140 in dielectric material 130 biased by the electric field between first electrode layer 132 and second electrode layer 134.

The collector electrode of e-paper 104 is held at minus 2000 volts, which pulls positive charges 128 that pass through hole 140 onto imaging surface 112. The positive charges 128 on imaging surface 112 bias particles, such as black particles 116, toward imaging surface 112 to provide digital media images on e-paper 104. In some examples, negative charges are used to bias suitably colored particles.

FIG. 3B is a diagram illustrating in one example of the present disclosure the operation of imaging system 100 in the "off" state, where positive charges 128 from imaging unit 102 are blocked by electrode array 124 from being transferred to imaging surface 112. Corona wire 122 is held at 5000 volts to generate positive charges 128 and housing 126 is held at 0 volts (ground). First electrode layer 132 is held at 50 volts and positive charges 128 drift from corona wire 122 to electrode array 124 and first electrode layer 132. Second electrode layer 134 is switched to and held at 150 volts and positive charges 128 are blocked from passing through hole 140 in dielectric material 130 by the electric field between second electrode layer 134 and first electrode layer 132.

The collector electrode of e-paper 104 is held at minus 2000 volts. However, positive charges 128 do not pass through hole 140 and onto imaging surface 112. Particles, such as white particles 118, which may have been previously biased toward imaging surface 112 remain at that surface to provide digital media images on e-paper 104. In some examples, negative charges are used to bias suitably colored particles.

In some examples of imaging system 100, first electrode layer 132 is held at 50 volts in both the on state and the off state, and second electrode layer 134 is switched between 0 volts and 150 volts to switch between the on state and the off state, respectively.

Figure 4A:
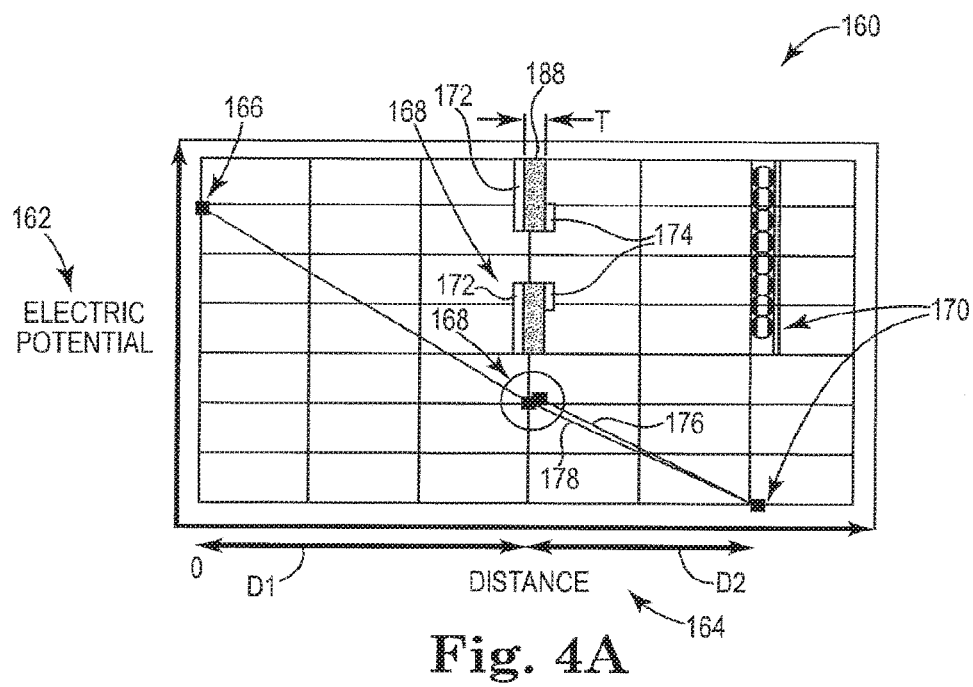
FIG. 4A is a graph illustrating a plot of electric potential versus distance along a path from a charge generating device to an addressable electrode array and to a collector electrode, according to one example of the present disclosure.
Figure 4B:
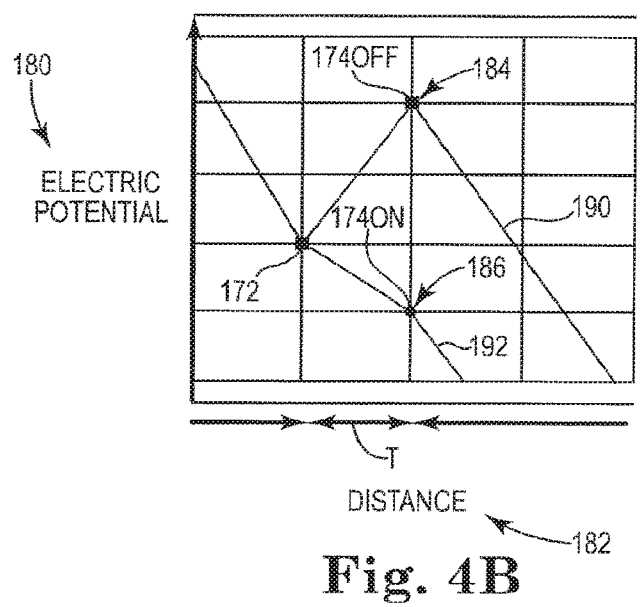
FIG. 4B is an enlarged graph illustrating the electric potential versus distance at the electrode array in the off state and in the on state, according to one example of the present disclosure.

FIGS. 4A and 4B are graphs illustrating how imaging heads, such as the previously described imaging units 20, 50, and 102, operate according to one example of the present disclosure. Although it will be understood that the electric fields around each of the holes or nozzles are three-dimensional, a one-dimensional analogy serves to explain aspects of operation.

FIG. 4A is a graph 160 illustrating in one example of the present disclosure a plot of electric potential at 162 versus distance at 164 along a path from a charge generating device at 166, such as corona wire 122, to an addressable electrode array at 168, such as electrode array 124, and to a collector electrode at 170, such as e-paper 104. The plot is drawn based on the extraction of positive charges from the charge generating device.

Charges drift from the charge generating device at 166 to the electrode array at 168. The positive charges drift from the higher electric potential at 166 to the lower electric potential at 168, a distance D1 as illustrated in FIGS. 1-4A. In one example, the positive charges drift from a corona wire at 168 at 5000 volts to first electrode layer 172 at 50 volts.

At 168, the electrode array is switched to the off state to block charges from passing through the electrode array at 168 or switched to the on state to pass charges through the electrode array at 168 to the collector at 170. If the electrode array at 168 is switched to the off state, electric potential is increased from the first electrode layer at 172 to the second electrode layer 174 to prevent charges from passing through the electrode array at 168. The electric potential decreases at 176 from the second electrode layer at 174 to the collector at 170, a distance D2 as illustrated in FIGS. 1-4A. The positive charges are blocked at the electrode array 168. In one example, the positive charges drift from second electrode layer 174 at 150 volts to the collector at 170, such as e-paper, at minus 2000 volts.

If the electrode array at 168 is switched to the on state, electric potential is decreased from the first electrode layer at 172 to the second electrode layer at 174 to pass charges through the electrode array at 168. At 178, the electric potential decreases from the second electrode layer at 174 to the collector at 170, the distance D2. The positive charges pass through the electrode array 168 and drift to the collector at 170. In one example, the positive charges drift from second electrode layer 174 at 0 volts to the collector at 170, such as e-paper, at minus 2000 volts.

FIG. 4B is an enlarged graph schematically illustrating, in one example of the present disclosure, electric potential at 180 versus distance at 182 at with the electrode array at 168 in the off state at 184 and in the on state at 186. Distances D1 and D2 are longer or larger than the thickness T of the dielectric material at 188 (shown in FIG. 4A). Due to the smaller thickness T of the dielectric material at 188, a small difference in electric potential between the first electrode layer at 172 and the second electrode layer at 174 generates a large electric field, where the electric field is approximately the change in voltage from the first electrode layer at 172 to the second electrode layer at 174 divided by the thickness T of the dielectric material at 188.

In the off state at 184, electric potential is increased from the first electrode layer at 172 to the second electrode layer at 174off to prevent charges from passing through the electrode array at 168. At 190, the electric potential decreases from the second electrode layer at 174off to the collector at 170. The positive charges are blocked at the electrode array 168. In one example, in the off state at 184 the first electrode layer at 172 is at 50 volts and the second electrode layer at 174off is at 150 volts.

In the on state at 186, electric potential is decreased from the first electrode layer at 172 to the second electrode layer at 174on to pass charges through the electrode array at 168. At 192, the electric potential decreases from the second electrode layer at 174on to the collector at 170. The positive charges pass through the electrode array 168 and drift to the collector at 170. In one example, in the on state at 186 the first electrode layer at 172 is at 50 volts and the second electrode layer 174on is at 0 volts.

In some examples, the plots in FIGS. 4A and 4B can be drawn based on the extraction of negative charges from the charge generating device. Also, in some examples, the first and second electrode layers can be switched, such that the second electrode layer faces the charge generating device and the first electrode layer faces the collector and suitable voltages applied to block and pass charges at the electrode array at 168.

FIGS. 5A-9 are diagrams illustrating examples of non-charge generating addressable electrode grid arrays that can be used in imaging units 20, 50, and 102 of FIGS. 1-3B, according to at least some examples of the present disclosure. The electrode grid arrays enable high resolution imaging of passive e-paper medias.

In general terms, at least some of the electrode arrays include a plurality of nozzles or holes extending through a dielectric material layer and through at least two layers of conductive material separated by the dielectric material layer, which has a thickness T. In some examples, the conductive layers are made of copper and include at least one additional plated layer, such as electroless nickel and gold or immersion Tin. In one aspect, this arrangement provides thin protective finishing layers on the copper and prevents corrosion of the copper in the charge plasma environment.

In one aspect, the size of the holes in the electrode array limits the minimum size of dots for imaging digital media images. Circular holes have a diameter Dm, but the holes can be other suitable shapes, such as rectangular. In one example, each of the holes is circular and less than 150 micrometers in diameter. In one example, each of the holes is circular and less than 100 micrometers in diameter to provide 300 dots per inch and higher resolution.

In each of the electrode arrays, there is a range of aspect ratios T/Dm for which conditions exist where charges can be blocked and passed through the electrode arrays. If the aspect ratio T/Dm is much greater than 1, it is difficult to pass charges through the holes in the electrode array, and if the aspect ratio T/Dm is much less than 1, it is difficult to prevent charges from passing through the electrode array. In one example, the optimal aspect ratio T/Dm is about 1, such that the dielectric material layer is relatively thin and on the order of 25-100 micrometers in thickness T for high resolution imaging. In one example, the dielectric material layer is a flexible circuit material. In one example, the dielectric material layer is a polyimide that has a high dielectric strength and provides for chemical etching or laser ablation to open small accurate holes with non-conductive walls.

Figure 5A:
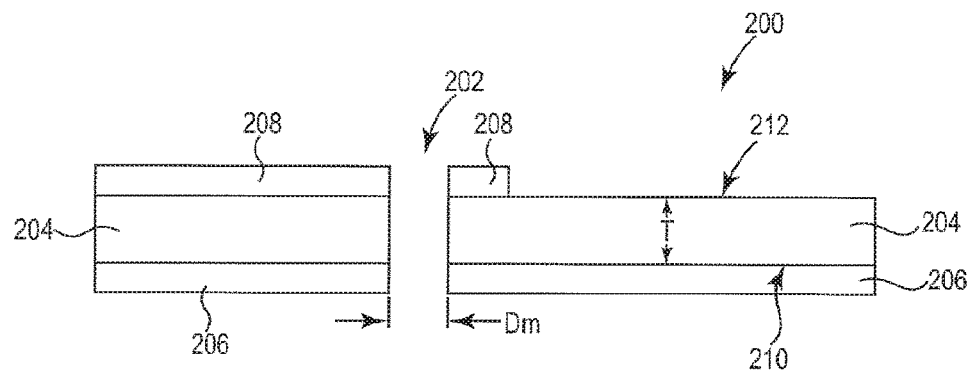
FIG. 5A is a diagram including a sectional view of an electrode array taken along the line 5A-5A in FIG. 5B, according to one example of the present disclosure.
Figure 5B:
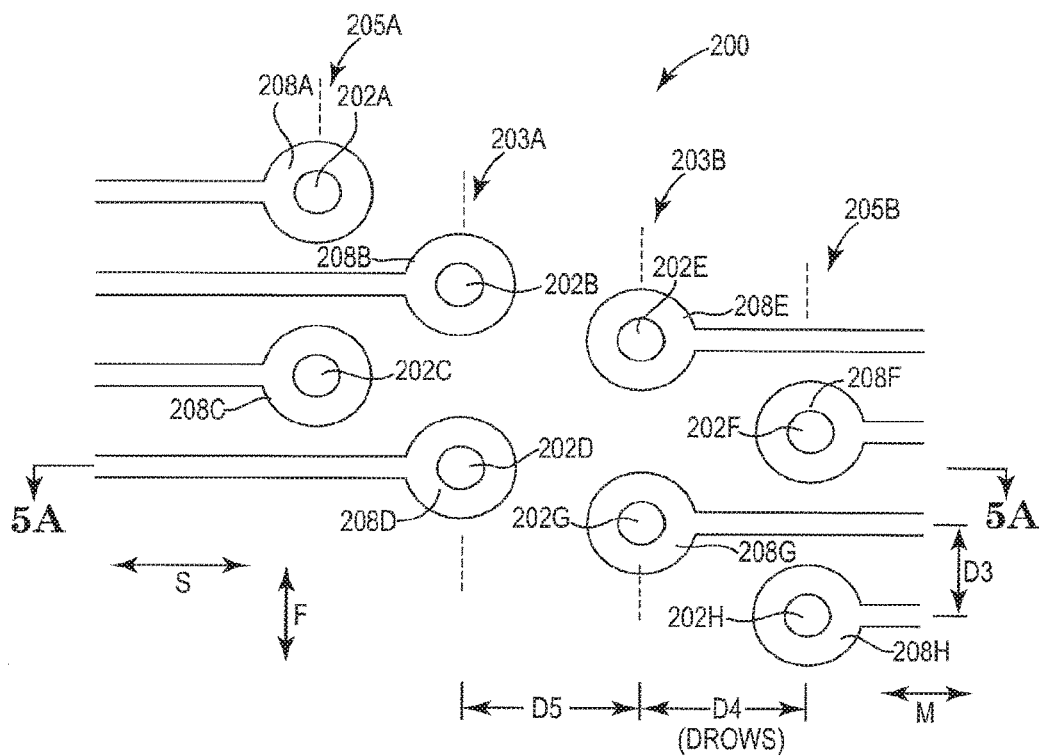
FIG. 5B is a diagram including a plan view schematically illustrating finger electrodes formed in a second electrode layer on a dielectric material layer, according to one example of the present disclosure.

FIGS. 5A and 5B are diagrams schematically illustrating a non-charge generating addressable electrode grid array 200, according to one example of the present disclosure. The array 200 includes multiple holes or nozzles 202 that extend through dielectric material layer 204, first conductive electrode layer 206, and second conductive electrode layer 208. In one example, dielectric material layer 204 is a dielectric film. In one example, each of the first and second conductive electrode layers 206 and 208 includes copper.

FIG. 5A is a cross-section diagram of electrode array 200 taken along the line 5A-5A in FIG. 5B. Dielectric material layer 204 has thickness T, and a first side 210 and a second side 212 that is opposite first side 210. First electrode layer 206 is on first side 210 of dielectric material layer 204 and second electrode layer 208 is on second side 212 of dielectric material layer 204. Dielectric material layer 204 includes the holes 202 that extend through dielectric material layer 204 from first side 210 to second side 212 and that extend through first electrode layer 206 and second electrode layer 208. First electrode layer 206 is formed around the circumference of each of the holes 202 to surround the holes 202 on first side 210 and provide a common electrode for the holes 202. Each of the holes 202 has a diameter Dm.

FIG. 5B is a diagram illustrating in one example of the present disclosure finger electrodes 208-208H formed in second electrode layer 208 on dielectric material layer 204. Each of the finger electrodes 208A-208H has a circular landing pad formed around the circumference of a corresponding one of the holes 202A-202H on second side 212, such that finger electrode 208A is formed around the circumference of hole 202A, finger electrode 208b is formed around the circumference of hole 202b, and so on. Each of the finger electrodes 208A-208H surrounds the corresponding one of the holes 202A-202H to provide a single finger electrode 208A-208H for the corresponding one of the holes 202A-202H. Also, each of the finger electrodes 208A-208b is individually addressable, such that each of the holes 202A-202H is individually addressable to control the flow of charges through each of the holes 202A-202H separately.

In operation, temporal and spatial control of charges flowing through electrode array 200 is achieved by individually addressing finger electrodes 208A-208H to apply on state or off state electrical potentials between finger electrodes 208A-208H and the common electrode of first electrode layer 206.

In one aspect, nozzles 202D,202B are staggered or spaced apart from nozzles 202A, 202C in a first (F) orientation as represented via directional arrow F (also shown later in FIG. 6A). In another aspect, nozzles 202D, 202B forming an inner row 203A which is staggered relative to (i.e. spaced from) nozzles 202A, 202C (forming a second/outer row 205A) in a second (S) orientation as represented by directional arrow S (also shown later in FIG. 6A).

Similarly, nozzles 202G, 202E are staggered relative to nozzles 202H, 202F in a first orientation as represented via directional arrow F (also shown later in FIG. 6A). In another aspect, nozzles 202G, 202E form an inner row 203B extending parallel to the first orientation (and generally parallel to a corona wire) while nozzles 202H, 202B form a second/outer row 205B extending generally parallel to inner row 203B.

The inner row 203B of holes 202G, 202E is staggered relative to (i.e. spaced apart from) nozzles 202H, 202B by a distance (D4) in a second orientation as represented by directional arrow S (also shown later in FIG. 6A). As later described in association with FIGS. 6A-B and 7A-7B, this distance D4 is also referred to as a minimum distance $d_{ROWS}$.

Similarly, nozzles 202B, 202D in inner row 203A are spaced apart (in the second orientation) from nozzles 202A, 202C in outer row 205A by the same minimum distance.

Furthermore, nozzles 202D, 202B are staggered relative to nozzles 202G, 202E in both the first (F) and second (S) orientations.

As further shown in FIG. 5B, distance $d_{ROWS}$ denotes a distance between adjacent rows of nozzles in an orientation (S) generally parallel to the direction of relative motion (M) between the imaging head and a to-be-imaged media. In one aspect, the distance $d_{ROWS}$ (i.e. D4) and the relative speed between the e-paper media and the addressable imaging head during the imaging process (i.e. Vprocess) determines the time delay at which successive rows (in the process direction) are imaged on the e-paper until the full designed resolution of the image is achieved.

In one aspect, a minimum value for $d_{ROWS}$ is based on a minimum amount of time for the charges deposited onto the e-paper (e.g., a combination of e-paper and functional coating layer) to adequately dissipate from at least the charge-deposition-surface, which includes a period of time during which the color particles in the charge-responsive layer complete their response to charges received from the charge-generating device. In particular, after completion of the switch, a large portion of the field originally generated by the deposited charges on the e-paper surface neutralizes to a negligible level.

Figure 5C:
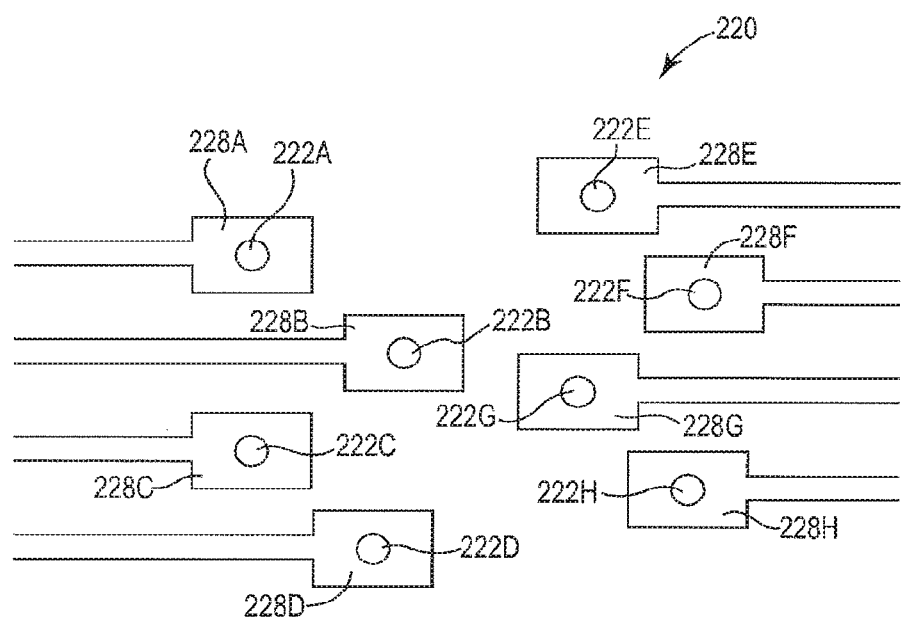
FIG. 5C is a diagram including a plan view schematically illustrating an electrode array including finger electrodes that have rectangular shaped landing pads, according to one example of the present disclosure.

Further aspects regarding parameters of time, distance, and speed of travel associated with achieving quality imaging, as well as a related dissipation of charges, are later described in association with at least FIGS. 6A-6D. FIG. 5C is a diagram schematically illustrating, in one example of the present disclosure, an electrode array 220 including finger electrodes 228A-228H that have rectangular shaped landing pads. Electrode array 220 is similar to electrode array 200 of FIGS. 5A and 5B and finger electrodes 228A-228H are similar to finger electrodes 208A-208H (shown in FIG. 5B), except finger electrodes 228A-228H have rectangular shaped landing pads instead of circular landing pads. As shown in FIG. 5C, finger electrodes 228A-228H are formed in second electrode layer 228 that is on dielectric material layer 224. Each of the finger electrodes 228A-228H has a rectangular shaped landing pad formed around the circumference of a corresponding one of the holes 222A-222H, such that finger electrode 228A is formed around the circumference of hole 222A, finger electrode 228B is formed around the circumference of hole 222b, and so on. Each of the finger electrodes 228A-228H surrounds the corresponding one of the holes 222A-222H to provide a single finger electrode 228A-228H around the corresponding one of the holes 222A-222H. Also, each of the finger electrodes 228A-228b is individually addressable, such that each of the holes 222A-222H is individually addressable to control the flow of charges through each of the holes 222A-222H separately.

In operation, temporal and spatial control of charges flowing through electrode array 220 is achieved by individually addressing finger electrodes 228A-228H to apply on state or off state electrical potentials between finger electrodes 228A-228H and the common electrode of a first electrode layer (not shown) that is on the other side of dielectric material 224. FIGS. 6A-6D provide further details regarding configuration of holes in electrode arrays that enhance quality imaging by arrangement of the holes into a two-dimensional array, such that adjacent rows of nozzle are staggered relative to each other (and relative to a corona wire) in a direction generally parallel to an orientation in which relative movement between the imaging unit and the e-paper occurs.

Figure 6A:
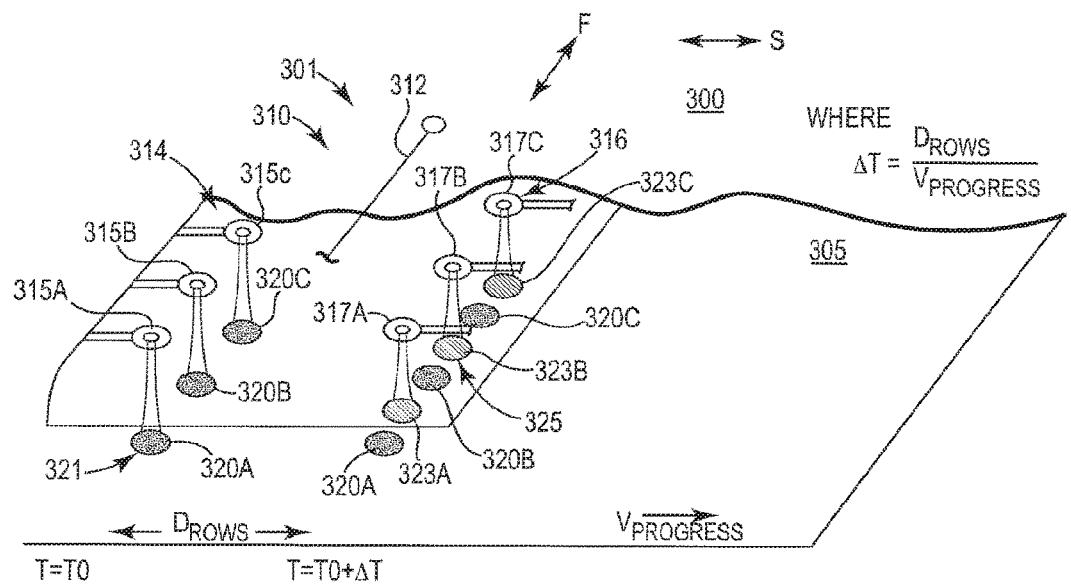
FIG. 6A is a diagram including a perspective view schematically illustrating non-contact deposition of charges via a two-dimensional electrode array, according to an example of the present disclosure.

FIG. 6A is a diagram 300 including a perspective view schematically illustrating an imaging system 301, according to one example of the present disclosure. In one example, the imaging system 301 includes an imaging head that is at least consistent with, and/or includes at least some of substantially the same features and attributes as, the imaging units and systems previously described in association with at least FIGS. 1-5C. In one aspect, for purposes of illustration in diagram 300, it will be understood that both an imaging side and a viewing side of an e-paper display media are located together such as the exposed surface in FIG. 6A. In one aspect, the exposed surface comprises a functional coating (i.e. protective layer, which may have semi-conductive properties) that forms a top layer of the e-paper structure.

With this in mind, diagram 300 in FIG. 6A provides a perspective view of a nozzle array 314 of the imaging unit 310 and a corona wire 312 (corona housing not shown for clarity), with the imaging substrate (e.g., passive e-paper) underneath it moving as streams of charges (depicted as cones 319) from the nozzle array cause formation of dots on the e-paper 305.

As further shown in FIG. 6A, the imaging system 301 includes an imaging unit 310 including a single corona wire 312 vertically spaced above an array 314 of electrode nozzles 315A-315C, 317A-317C. In one aspect, the single corona wire 312 is an elongate member extending in a first (F) orientation. In one example, the layout and relative spacing between nozzles 315A-315C, 317A-317C has generally the same features and attributes as the arrays 200, 220 of at least FIGS. 5A-5C.

As further shown in FIG. 6A, system 301 provides a positioning mechanism to provide for relative movement (in a second (S) orientation) between the imaging unit 310 and passive e-paper media 305. For purposes of discussion in FIG. 6A, it will be assumed that imaging unit 310 is fixed and passive e-paper media 305 moves relative to imaging unit 310 although it will be understood that in some examples, imaging unit 310 is movable while e-paper 305 is fixed, or both imaging unit 310 and e-paper 305 are movable relative to each other.

As shown in FIG. 6A, a first row 314 of nozzles 315A, 315B, 315C extends in the first orientation and is generally parallel to, and staggered relative to (i.e. spaced apart from) a second row 316 of nozzles 317A, 317B, 317C (also extending in the first orientation), respectively, in generally the same way that at least nozzles 202D, 202B in row 203A are staggered relative to nozzles 202G, 202E in row 203B in array 200 in FIG. 5B. In one aspect, this staggered arrangement is represented by the spaced distance ($d_{ROWS}$) along the second (S) orientation. Depending on which adjacent rows of nozzles are under consideration, the distance can have a different value. For example, as shown in FIG. 5B, in some implementations, the distance $d_{ROWS}$ corresponds to the distance D5 between row 203A of nozzles 202D, 202B and row 203B of nozzles 202G, 202E while in some examples, the distance $d_{ROWS}$ corresponds to the distance (D4) between the row 203B of nozzles 202G, 202E and the row 205B of nozzles 202H, 202F.

In one aspect, in FIG. 6A the first row 314 of nozzles 315A-315C deposits charges to cause imaging (i.e. a response in the passive e-paper to the deposited charges) resulting in the first row 321 of dots 320A, 320B, 320C (represented via solid marking). With relative motion still occurring, after a predetermined time period (ΔT) the second row 316 of nozzles 317A, 317B, 317C deposits charge to causing imaging, resulting in second set 325 of dots 323A, 323B, 323C (represented via cross-hatching). During the delay ($\Delta T = d_{ROWS}/V_{PROCESS}$) between that application of the set of charges from the first row 314 of nozzles (resulting in dots 320A-320C) and the application of the set of charges from the next row 316 of nozzles (resulting in dots 323A-323C), the field from those first set of charges has dissipated. In one aspect, this dissipation includes a combined action of charge dissipation on the functional coating of the e-paper and due to charged particle motion inside the e-paper. Accordingly, with a sufficient time delay (ΔT) for a given Vprocess, the newly applied dots 323A-323C arrive upon a generally uncharged surface of e-paper, thereby avoiding any unwanted interference from prior charges (described later in association with at least FIGS. 6B-6D).

Figure 6B:
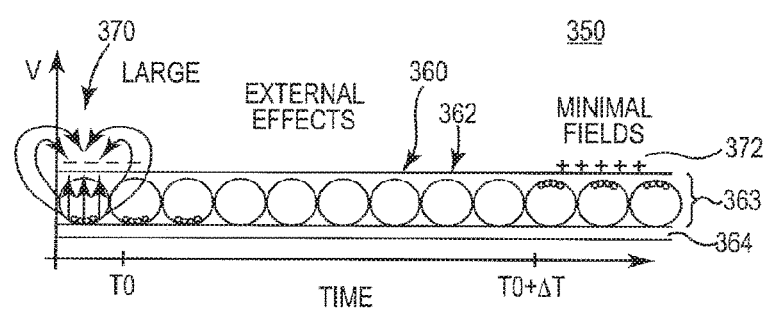
FIG. 6B is a diagram schematically illustrating a qualitative comparison of surface charges at different points in time, according to one example of the present disclosure.

FIG. 6B is a diagram schematically illustrating the presence of electric fields on an imaging surface of an e-paper media, according to an example of the present disclosure. In particular, diagram 350 in FIG. 6B provides a qualitative representation of a volume of charges at the charge-receiving surface at two different points in time: (1) upon initial receipt of deposited charges; and (2) after dissipation of most charges, following the switch of the charged color particles in response to the initially deposited charges.

In one aspect, FIG. 6B is a diagram schematically illustrating an e-paper structure 360 having an charge-receiving surface 362 (i.e. image-writing surface), a charge-responsive layer 363, and a counter electrode 364, in a manner consistent with examples previously described in association with at least FIGS. 1-5C. As shown in FIG. 6B, diagram 350 schematically depicts the behavioral appearance and attributes of electric fields around charges deposited from the nozzles at a first point in time t0, at which a row of image charges has just been deposited on surface 362. Diagram 350 further illustrates shows the behavioral appearance and attributes of electric fields at the same location on the e-paper surface 362 at a second point in time t0+Δt, which corresponds with a completion of switching of the charged color particles within the charge-responsive layer 363. At the second point in time (t0+Δt), the charged color particles (e.g. pigmented particles) generally have completed their migration in response to the deposited charges. Upon completion of the switch, the fringing fields 370 from the deposited charges are generally neutralized. In one aspect, some of the deposited charges also are dissipated through the charge-receiving layer above the charge-responsive layer. While generally negligible in terms of affecting the future deposit of more charges, some minimal fringing fields 372 sometimes remain.

Accordingly, FIGS. 6A-6B demonstrate one basis for determining a distance between adjacent staggered rows of nozzles such as D5, D4 between adjacent rows of nozzles in the array of FIG. 5B. In another aspect, FIGS. 6A, 6B also demonstrate some principles for achieving quality imaging via passive e-paper imaged via a two-dimensional array of nozzles instead of a linear (i.e. single line or one-dimensional) series of nozzles underneath a charge generator, such as a single corona wire. Accordingly, in this way, at least some examples of the present disclosure overcome interference patterns which can occur with one-dimensional series of nozzles, and which are demonstrated in more detail below.

Accordingly, in at least some examples, based on the foregoing information, including establishing a minimum time value (for a given speed Vprocess) for the charge-induced field on the e-paper surface to dissipate (i.e. the minimum surface charge dissipation time), one can determine appropriate values of parameters (such as a minimum distance $d_{ROWS}$) associated with arranging rows of nozzles of an electrode array for a given imaging system to achieve quality imaging of passive e-paper media 305.

For instance, in some examples, the two-dimensional (2-D) nature of the imaging head and the arrangement of the fully addressable space into adjacent rows allows adjusting the timing ($t_{DELAY}=d_{ROWS}/V_{PROCESS}$) by simply changing the distance (such as D4, D5 in FIG. 5B) between rows and distributing the desired number of pixels per unit width into as many rows as appropriate. Furthermore, in some examples, the electrode array can be tailored to the specific target speed (of relative movement between the imaging unit and the e-paper). It will be understood, however, that increasing a distance between rows of nozzles of the array beyond a minimum distance (such as $d_{ROWS}$) will, in some instances, involve taking additional steps to provide a uniform supply of charges to all the rows. Accordingly, at least some examples of the present disclosure regarding providing a uniform supply of charges to spaced apart rows of nozzles (in a two-dimensional electrode array) are later described in association with at least FIGS. 7A-11.

Figure 6C:
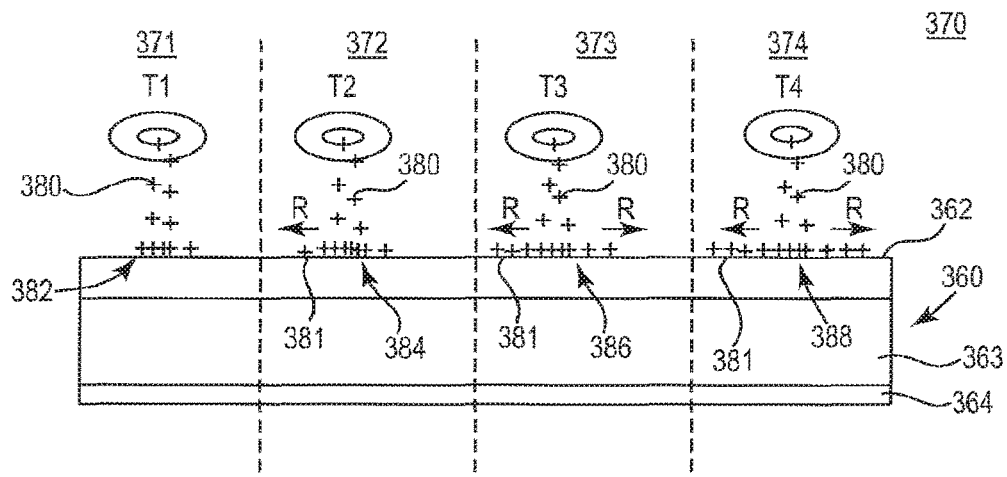
FIG. 6C is a diagram including a side view schematically illustrating charge build-up on a surface of e-paper media that occurs in the absence of at least some examples of the present disclosure.
Figure 6D:
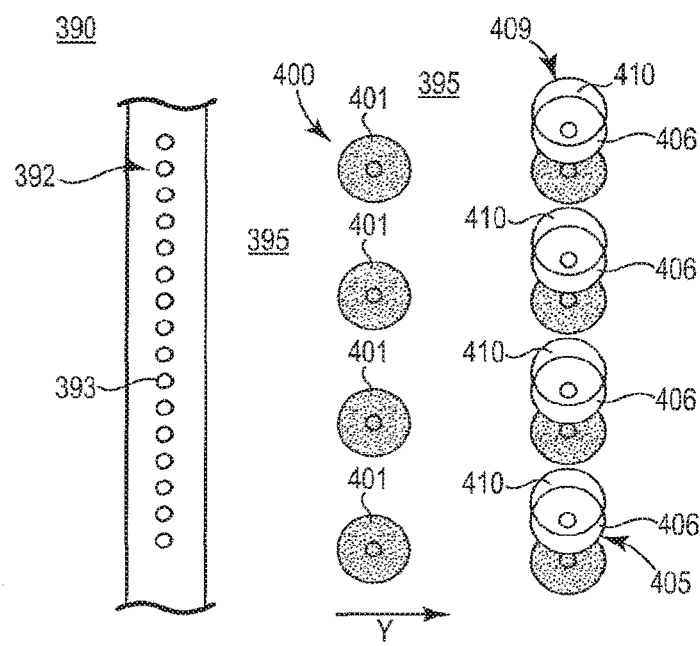
FIG. 6D is a diagram including a top plan view schematically illustrating an inter symbol interference pattern associated with charge deposition in the absence of at least some examples of the present disclosure.

FIGS. 6C-6D are diagrams schematically illustrating phenomenon associated with some instances of deposition of charges on e-paper structures. In particular, when sprayed charges become deposited on a receiving surface, there are interactions between the already-deposited charges and any new incoming charges from the imaging head. In one aspect, these interactions produce unwanted behavior within a single imaged dot as well as unwanted behavior between adjacent dots.

FIG. 6C is a diagram 370 including a side sectional view schematically illustrating a charge distribution pattern on one surface portion of an e-paper structure 360 resulting from on-going deposition of charges through successive points in time t1-t4 (denoted per numerals 371-374, respectively). As further described below in more details, FIG. 6C demonstrates that charges already present within a single imaged dot define a field 382 that pushes any newly arrived charges 381 sideways (repelling action represented via arrow R) increasing the effective size of the imaged dot. In some instances, this phenomenon is referred to as dot blooming.

As shown FIG. 6C, a nozzle 375 emits airborne charges 380 which travel under influence of an electric field in a generally cone-shaped configuration to impact a charge-receiving layer 362 of an e-paper structure 360. In one example, the e-paper structure 360 also includes a ground or counter electrode 364 and a charge-responsive layer 363 sandwiched between the counter electrode 364 and the charge-receiving layer 362.

At time point t1 (371), deposited charges 382 generally form a circular shape having a diameter according to a natural diameter of the virtual cone formed by the flow of charges from nozzle 375.

At time point t2 (372), the cumulative deposited layer of charges spreads laterally because successively deposited charges 381 are generally repelled (represented by arrow R) by the charges 384 already located on the surface. At illustrated at later time points t3 (373) and t4 (374), this spreading pattern continues to grow with the latest deposited charges 381 traveling laterally along the surface 362 far beyond their originally intended location, as represented by patterns 386, 388. Accordingly, the diagram of FIG. 6C demonstrates a "dot-blooming" effect in which deposition of new charges 381 at locations near other already-deposited charges will cause a significant spread of successive charges well beyond the intended target location. Among other implications, such charge spreading negatively impacts image quality by contributing to poor resolution. At least some examples of the present disclosure, including those having a two-dimensional electrode array, negate such effects by accounting for, and compensating for, the presence of the already-deposited charges.

FIG. 6D is a diagram including a top plan view schematically illustrating unwanted interference patterns associated with deposition of charges onto an e-paper structure. In one aspect, already-deposited charges in one dot can negatively affect the receipt of new charges in an adjacent dot. In particular, the already-deposited charges (present in one dot) repel new charges being deposited into an adjacent dot. In one aspect, this interference is referred to as Inter Symbol Interference (ISI). FIG. 6D provides one schematic representation of this type of interference.

Figure 7A:
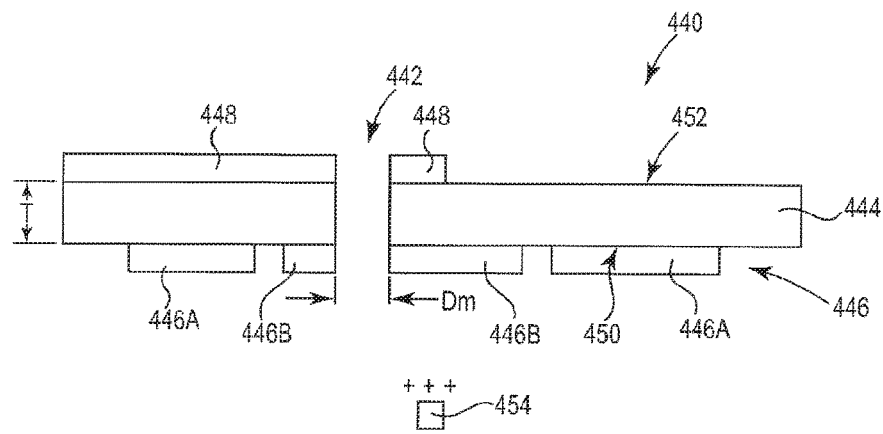
FIG. 7A is a diagram including a sectional view of an electrode array taken along the line 7A-7A in FIG. 7B, according to one example of the present disclosure.
Figure 7B:
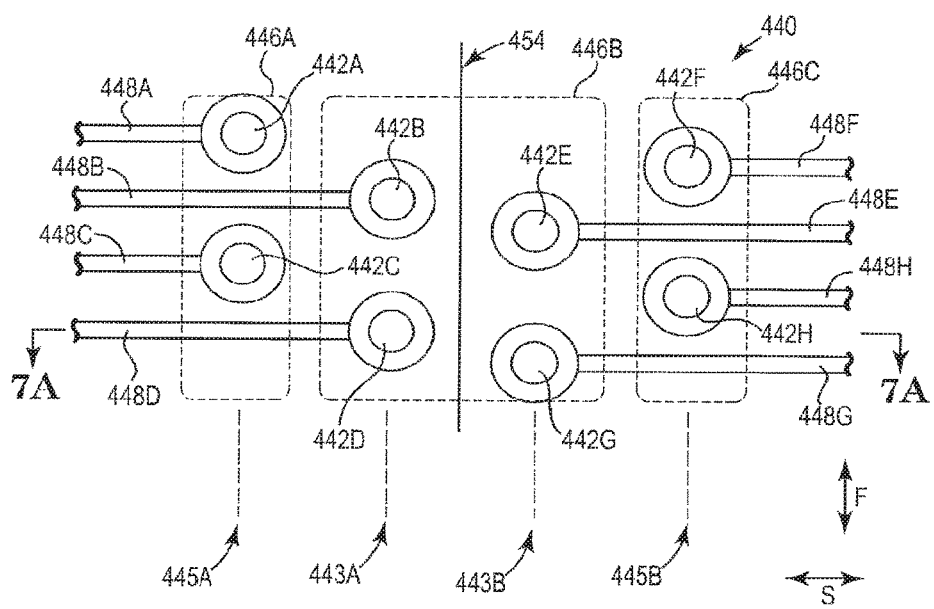
FIG. 7B is a diagram including a plan view schematically illustrating an electrode array having two common electrodes, according to one example of the present disclosure.

As shown in the diagram 390 of FIG. 6D, a portion of an imaging system includes a single row 392 of nozzles 393 through which charges (from a charge generator located directly above the row of nozzles) flow to be deposited onto an imaging surface below the nozzles. Assuming relative movement (as represented via directional arrow Y) of the nozzles and the imaging surface 395, at t1 nozzles 401 deposit charges resulting in formation of a first row 400 of dots 401 on the imaging substrate 395. Upon further relative movement, other nozzles 393 within the same row 401 are used to direct charges at a set 405 of target locations 406. However, as shown at t2, as the directed charges arrive at the target locations 406, the already-deposited charges within dots 401, repel the newly arriving charges destined for target locations 406, resulting in the newly arriving charges (sent via second group of nozzles 393) being pushed off to arrive at a set 409 of errant locations 410 instead of the target locations 406. Among other implications, such interference patterns negatively impact image quality by contributing to poor resolution. At least some examples of the present disclosure, including those having a two-dimensional electrode array, negate such effects by accounting for, and compensating for, the presence of the already-deposited charges. FIGS. 7A and 7B are diagrams schematically illustrating a non-charge generating addressable electrode grid array 440, according to one example of the present disclosure. The grid array 440 that includes two common electrodes 446A and 446B in the first electrode layer 446. Electrode array 440 includes multiple holes or nozzles 442 that extend through dielectric material layer 444, first conductive electrode layer 446, and second conductive electrode layer 448. In one example, dielectric material layer 444 is a dielectric film. In one example, each of the first and second conductive electrode layers 446 and 448 includes copper.

FIG. 7A is a cross-section diagram of electrode array 440 taken along the lines 7A-7A in FIG. 7B. Dielectric material layer 444 has thickness T, and a first side 450 and a second side 452 that is opposite first side 450. First electrode layer 446 is on first side 450 and second electrode layer 448 is on second side 452. Dielectric material layer 444 includes the holes 442 that extend through dielectric material layer 444 from first side 450 to second side 452 and that extend through first electrode layer 446 and second electrode layer 448. Each of the holes 442 has a diameter Dm.

FIG. 7B is a diagram illustrating, in one example of the present disclosure, finger electrodes 448A-448H formed in second electrode layer 448 on dielectric material layer 444. Each of the finger electrodes 448A-448H has a circular landing pad formed around the circumference of a corresponding one of the holes 442A-442H on second side 452, such that finger electrode 448A is formed around the circumference of hole 442A, finger electrode 448B is formed around the circumference of hole 442B, and so on. Each of the finger electrodes 448A-448H surrounds the corresponding one of the holes 442A-442H to provide a single finger electrode 448A-448H for the corresponding one of the holes 442A-442H. Also, each of the finger electrodes 448A-448B is individually addressable, such that each of the holes 442A-442H is individually addressable to control the flow of charges through each of the holes 442A-442H separately.

In one aspect, this configuration yields four rows of holes with each row extending in a first orientation such that the rows extend generally parallel to an orientation in which the corona wire extends. The rows are spaced apart from each other along a second orientation that is generally transverse to the first orientation. In one aspect, this configuration in FIG. 7B is similar to the four row configuration in FIG. 5B.

Charges from charge generating device 454 take different paths to different holes 442. With charge generating device 454 situated as indicated in FIGS. 7A and 7B, where charge generating device 454 is generally centrally located between adjacent inner rows 443A, 443B, the charge path from charge generating device 454 to the outer rows 445A, 445B of holes 442A, 442C, 442F, and 442H is longer than the charge path from charge generating device 454 to the inner rows 443A, 443B of holes 442B, 442D, 442E, and 442G. Due to the difference in charge path distance, the electric field from charge generating device 454 to the outer rows of holes 442A, 442C, 442F, and 442H is different than the electric field to the inner rows 443A, 443B of holes 442b, 442D, 442E, and 442G, which causes fewer charges to be extracted from the holes 442A, 442C, 442F, and 442H in the outer rows 445A, 445B than from the holes 442B, 442D, 442E, and 442G in the inner rows 443A, 443B of holes if a single common electrode in first electrode layer 446 is used.

However, according to at least some examples of the present disclosure, in order to compensate for the difference in such distances, first electrode layer 446 is separated into first common electrode 446A that corresponds to holes 442A, 442C, 442F, and 442H in the outer rows 445A, 445B, and a second common electrode 446B that corresponds to holes 442B, 442D, 442E, and 442G in the inner rows 443A, 443B. First common electrode 446A is formed around the circumference of each of the holes 442A, 442C, 442F, and 442H in the outer rows 445A, 445B and second common electrode 446B is formed around the circumference of each of the holes 442B, 442D, 442E, and 442G in the inner rows 443A, 443B. First common electrode 446A and second common electrode 446B can be operated at different electrical potentials to extract charges through electrode array 440. By using different electric potentials at the first common electrode 446A (corresponding to the inner rows 443A, 443B of holes) and the second common electrode 446B (corresponding to the outer rows 445A, 445B of holes), the amount of charges flowing to the holes in both the inner and outer rows of holes can be equalized to enhance uniformity and image quality.

In operation, temporal and spatial control of charges flowing through electrode array 440 is achieved by individually addressing finger electrodes 448A-448H and the first and second common electrodes 446A and 446B (enabling differential control of electrical potential between inner and outer rows of holes) to apply on state or off state electrical potentials between finger electrodes 448A-448H and the first and second common electrodes 446A and 446B. In one aspect, the arrangement shown in FIGS. 7A-7B is deployed when operating at higher speeds (of relative movement between the imaging head and the imaging substrate) which sometimes involve a large $d_{ROW}$ value (e.g. distance D4 or D5 in FIG. 5B) to avoid inter symbol interference (ISI) demonstrated in at least FIGS. 6C-6D) between the imaged dots on the e-paper. In some examples, the distance (D1 in FIGS. 1-4A) between the wire and the electrode is 1 mm to about 4 mm, while the ratio of $d_{ROWS}$ relative to $d_{WIRE}$ is of the order of 2 or less. As this ratio increases beyond 2, there is a higher chance that the extracted current from different rows of nozzles may be different due to the different extraction fields.

Figure 8:
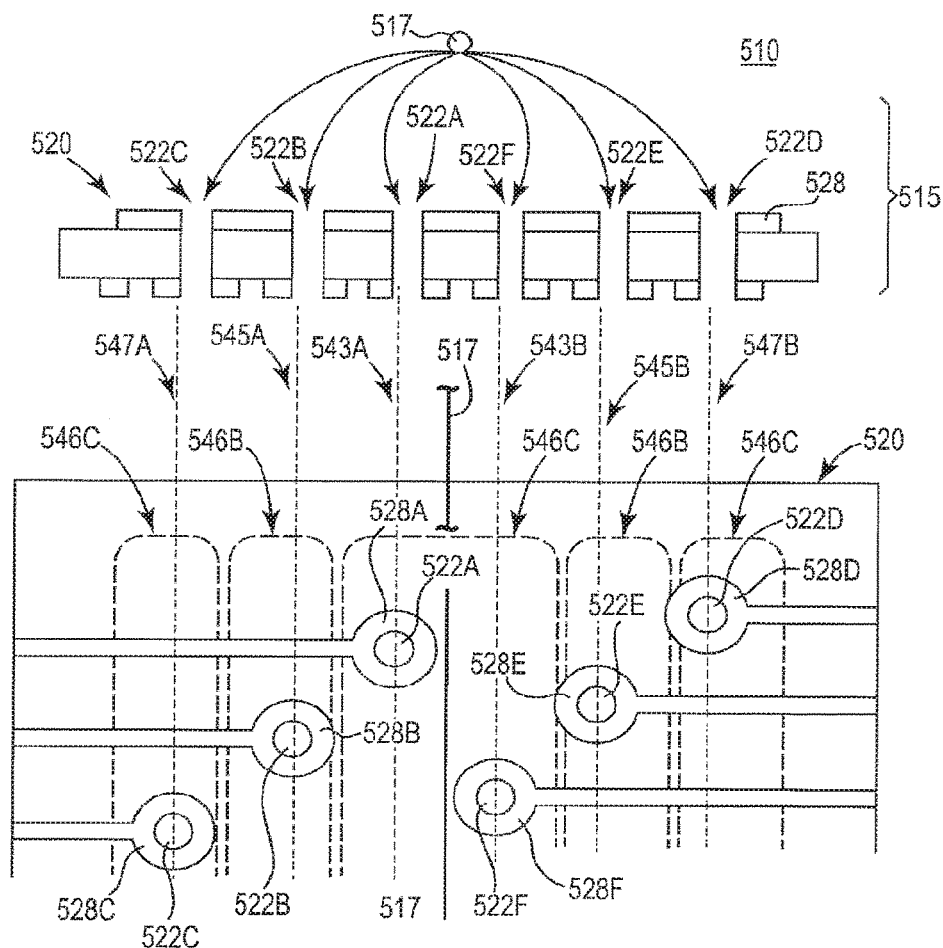
FIG. 8 is a diagram illustrating an electrode array having three common electrodes, according to one example of the present disclosure.

In some examples, the beneficial manner in which charges flow from the segmented electrodes in the examples of FIGS. 7A-7B, is extended to a larger number of rows and thus respective separate electrodes to compensate for the extraction field variations among the larger number of spaced apart rows. FIG. 8 shows an example of an array with six rows of nozzles and utilizing three separate areas of segmented electrodes in order to compensate for such extraction field differences.

In particular, FIG. 8 is a diagram 510 including a side view schematically illustrating an imaging unit 515 and a plan view schematically illustrating a two-dimensional addressable electrode array 520 of the imaging unit 515, according to an example of the present disclosure. As shown in FIG. 8, imaging unit 515 includes a single corona wire 517 disposed above six rows of nozzles 522A-522F (spaced apart along the orientation of relative movement between the imaging unit 515 and an imaging substrate, such as passive e-paper). The single corona wire 517 generates charges for selectively controlled passage through the nozzles 522A-522F. However, as further shown in the plan view portion of FIG. 8, the various nozzles 522A-522F are organized according to segmented electrode portions 546A, 546B, 546C in a manner substantially similar to the segmented electrode portions previously described in association with at least FIGS. 7A-7B.

With this in mind, nozzle 543A forms part of an inner row 543A of nozzles while nozzle 543B forms part of inner row 543B of nozzles, with charge generator 517 (e.g. an elongate corona wire) extending generally parallel to those rows and generally centrally located between rows 543A, 543B. In one aspect, both rows 543A, 543B of nozzles form a first set of nozzles. Nozzle 522B forms part of a row 545A of nozzles while nozzle 522E forms part of a row 545B of nozzles with both rows 545A, 545B spaced laterally outward (in opposite directions) from inner rows 543A, 543B. In one aspect, both rows 545A, 545B of nozzles form a second set of nozzles. Meanwhile, nozzle 522C forms part of a row 547A of nozzles while nozzle 522D forms part of a row 547B of nozzles with both rows 547A, 547B spaced laterally outward (in opposite directions) from inner rows 543A, 543B and rows 545A, 545B. In one aspect, both rows 547A, 547B of nozzles form a third set of nozzles.

In one example, as in the configuration of FIGS. 7A-7B, the respective first, second, and third set of nozzles are operated as respectively different electrical potentials to equalize the amount of charges flowing among the laterally spaced apart holes in the three sets of nozzles.

If the target ratio of $d_{ROWS}$ to D1 (FIGS. 1-4A) becomes much larger than 4, the compensation provided via segmented electrodes (FIGS. 7B, 8) is sometimes inadequate. Accordingly, some examples of the present disclosure employ multiple corona wires. With this in mind, reference is made to FIG. 11, which is a diagram 550 including a side view schematically illustrating an imaging unit 551 having an electrode array 560 with different rows of nozzles 522A-522F (spaced apart in the direction of media travel) and multiple corona wires 567A, 567B, 567C with each corona wire providing charges to just a pair of the rows of nozzles instead of a single corona wire to provide charges to all six rows of nozzles. In general terms, the multiple corona wires 567A-567C are distributed or spaced uniformly relative to the spaced apart rows For example, corona wire 567A provides charges primarily to nozzles 522C, 522B (which are in adjacent rows of nozzles), corona wire 567B provides charges primarily to nozzles 522A, 522F (which are in adjacent rows of nozzles), and corona wire 567C provides charges primarily to nozzles 522E, 522D (which are in adjacent rows of nozzles). In one aspect, each respective corona wire 567A, 567B, 567C is located intermediate the respective adjacent pair of rows between which the corona wire extends.

Figure 9:
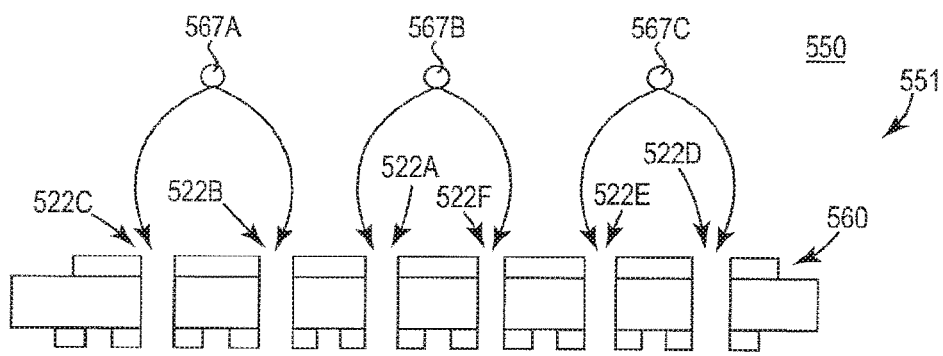
FIG. 9 is a diagram including a side view schematically illustrating an imaging head including multiple charge generating elements for an electrode grid array, according to one example of the present disclosure.

In one example, each corona wire 567A, 567B, 567C extends in a first orientation generally parallel to the respective rows, and the multiple corona wires 567A-567C are spaced apart from each other in the generally the same orientation (a second orientation generally transverse to the first orientation) in which the rows of nozzles are spaced apart from each other. In one aspect, the arrangement of using multiple spaced apart corona wires to provide charge generation among many rows of nozzle acts to significantly reduce or prevent non-uniformity of the extraction field that might otherwise occur if just one corona wire were used with a high quantity of spaced apart rows of nozzles. In some examples, the configuration of multiple corona wires illustrated in FIG. 9 is combined with one of the configurations of segmented electrodes (as the examples of FIGS. 7B, 8) to further ensure similar extraction currents from all the rows of nozzles. In other words, the configuration of multiple corona wires is combinable with the configuration of applying differential control over electrical potentials among different sets of rows of holes (in the electrode array), whereby more centrally located, inner rows of holes are operated at one electrical potential that is different than an electrical potential operated for outer rows of holes.

An alternative to the segmented electrode approach is to provide the adjustment of the extraction field by varying the $V_{fingerElectrode}$ potential for different rows. This is shown in FIG. 5 as having a value of 0 V but this is not a limitation, by bring this potential such that the extraction field for rows further from the corona wire more closely matches that of the closer rows of nozzles the extraction uniformity of the head may be compensated allowing for optimization of the row distance for improved ISI performance. For example, with reference to FIG. 7B, in some examples, the nozzles in rows 445A and 445B (outer rows) are biased during writing with the segmented electrode at 0 V while rows 443A and 443B correspond to a segmented electrode biased at a higher potential (e.g. 20 V) effectively reducing the extraction field as shown in FIG. 4B (effectively moving upwards point 186). In one aspect, this arrangement would help equalize the current flowing to those alternate rows.

Figure 10:
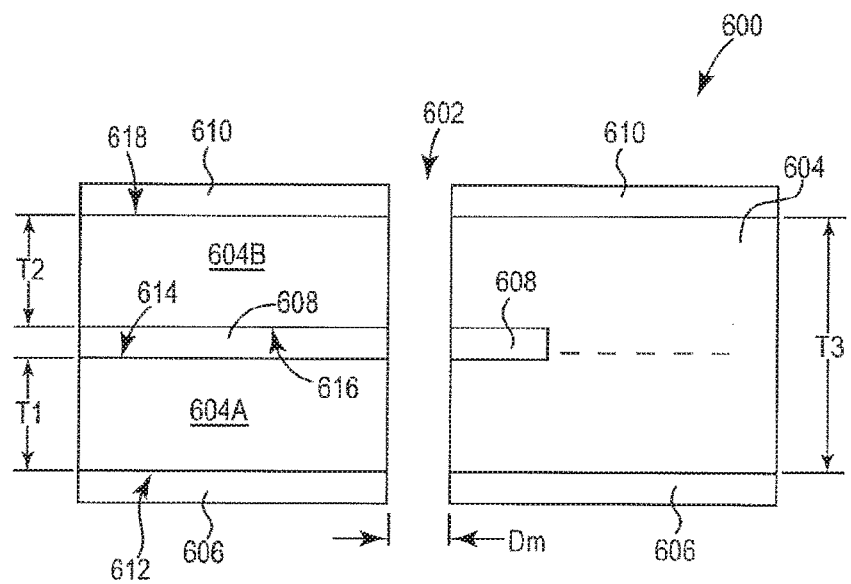
FIG. 10 is a side sectional view schematically illustrating an electrode grid array having more than two conductive electrode layers, according to one example of the present disclosure.

FIG. 10 is a diagram including a side view schematically illustrating a non-rechargeable electrode grid array 600 having more than two conductive electrode layers, according to one example of the present disclosure. Electrode array 600 includes multiple holes or nozzles 602, similar to electrode arrays 200, 220, and 440 (FIGS. 5A-5B, 5C, 7A-7B), which extend through dielectric material 604, first conductive electrode layer 606, second conductive electrode layer 608, and third conductive electrode layer 610. In one example, dielectric material 604 includes multiple layers of dielectric film. In one example, at least one of the first, second, and third conductive electrode layers 606, 608, and 610 includes copper.

Dielectric material 604 includes a first dielectric material layer 604a and a second dielectric material layer 604b. First dielectric material layer 604a has a thickness T1 and second dielectric material layer 604b has a thickness T2. Dielectric material 304 has overall thickness T3.

First dielectric material layer 604a has a first side 612 and a second side 614 that is opposite first side 612. First electrode layer 606 is on first side 612 and second electrode layer 608 is on second side 614. Second dielectric material layer 604b has a third side 616 and a fourth side 618. Second electrode layer 608 is on third side 616 and third electrode layer 610 is on fourth side 618. Dielectric material 604 includes hole 602 that extends through dielectric material 604, including first and second dielectric material layers 604a and 604b, from first side 612 to fourth side 618 and that extends through first electrode layer 606, second electrode layer 608, and third electrode layer 610. Hole 602 has a diameter Dm.

First electrode layer 606 is formed around the circumferences of the holes 602 to surround the holes 602 on first side 612, and third electrode layer 610 is formed around the circumferences of the holes 602 to surround the holes 602 on fourth side 618.

Second electrode layer 608 is formed into finger electrodes that each have a landing pad formed around the circumference of one of the holes, such as hole 602, on second side 614.

In some examples, second electrode layer 608 is formed into finger electrodes, such as those previously described in association with at least FIG. 5B. Accordingly, in one aspect, finger electrodes of second electrode layer 680 in FIG. 10 include substantially the same features and attributes as finger electrodes 208A-208H (shown in FIG. 5B) that each surround one of the holes 202A-2602H to provide a single finger electrode 208A-208H for the corresponding one of the holes 202A-202H, where each of the finger electrodes 208A-208B is individually addressable, such that each of the holes 202A-202H is individually addressable to control the flow of charges through the holes 202A-202H separately.

In operation, temporal and spatial control of charges flowing through electrode array 600 is achieved by individually addressing the finger electrodes in second electrode layer 608 to apply on state or off state electrical potentials between second electrode layer 608 and the first and third electrode layers 606 and 610, respectively.

By sandwiching the finger electrodes of second electrode layer 608 between first electrode layer 606 and third electrode layer 610, small changes in the electric field applied between electrode array 600 and the collector electrode, such as e-paper, due to switching the second electrode layer 608 between the on state and the off state can be compensated for and diminish inter-symbol interference.

Figure 11:
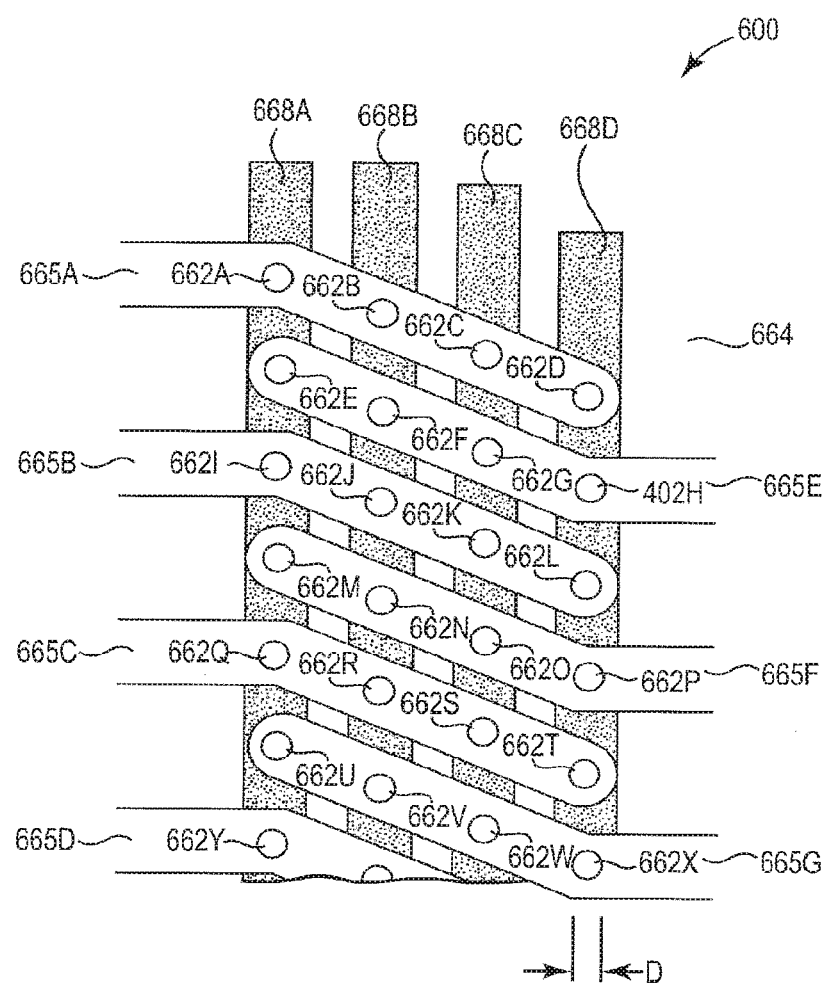
FIG. 11 is a diagram including a plan view schematically illustrating an electrode grid array having matrix addressing of holes or nozzles, according to one example of the present disclosure.

FIG. 11 is a diagram including a top view schematically illustrating an addressable electrode grid array 660 having matrix addressing of holes or nozzles 662, according to one example of the present disclosure. Electrode array 660 includes multiple holes 662A-662Y that extend through dielectric material layer 664, first conductive electrode layer 665, and second conductive electrode layer 668. First electrode layer 665 is on a first side of dielectric material layer 664 and second electrode layer 668 is under dielectric material layer 664 and on a second side of dielectric material layer 664 opposite the first side. Dielectric material layer 664 is shown as semi-transparent to show second electrode layer 668 under dielectric material layer 664 as dark stripes or columns. In one example, dielectric material layer 664 is a dielectric film. In one example, at least one of the first and second conductive electrode layers 665 and 668 includes copper.

Dielectric material layer 664 includes the holes 662A-662Y that extend through dielectric material layer 664 from the first side to the second side of dielectric material layer 664 and that extend through first electrode layer 665 and second electrode layer 668. Each of the holes 662 has a diameter Dm.

First electrode layer 665 is formed into finger electrodes 665A-665G. Each of the finger electrodes 665A-665G is formed around the circumferences of a plurality of holes 662, i.e., finger electrode 665A is formed around the circumferences of holes 662A-662D, finger electrode 665B is formed around the circumferences of holes 662I-662L, finger electrode 665C is formed around the circumferences of holes 662Q-662T, finger electrode 665D is formed around the circumferences of holes 662Y and others not shown, finger electrode 665E is formed around the circumferences of holes 662E-662H, finger electrode 665F is formed around the circumferences of holes 662M-662P, and finger electrode 665G is formed around the circumferences of holes 662U-662X.

Second electrode layer 668 is formed into finger electrodes 668A-668D. Each of the finger electrodes 668A-668D is formed around the circumferences of a plurality of holes 662, i.e., finger electrode 668A is formed around the circumferences of holes 662A, 662E, 662I, 662M, 662Q, 662U, and 662Y, finger electrode 668B is formed around the circumferences of holes 662B, 662F, 662J, 662N, 662R, and 662V, finger electrode 668C is formed around the circumferences of holes 662C, 662G, 662K, 662O, 662S, and 662W, and finger electrode 668D is formed around the circumferences of holes 662D, 662H, 662L, 662P, 662T, and 662X.

In operation, temporal and spatial control of charges flowing through electrode array 660 is achieved by individually addressing holes 662A-662Y. To address one of the holes 662A-662Y, one of the first electrode layer finger electrodes 665A-665G is selected and one of the second electrode layer finger electrodes 668A-668D is selected to apply on state or off state electrical potentials between the selected one of the finger electrodes 665A-665G and the selected one of the finger electrodes 668A-668D.

Figure 12:
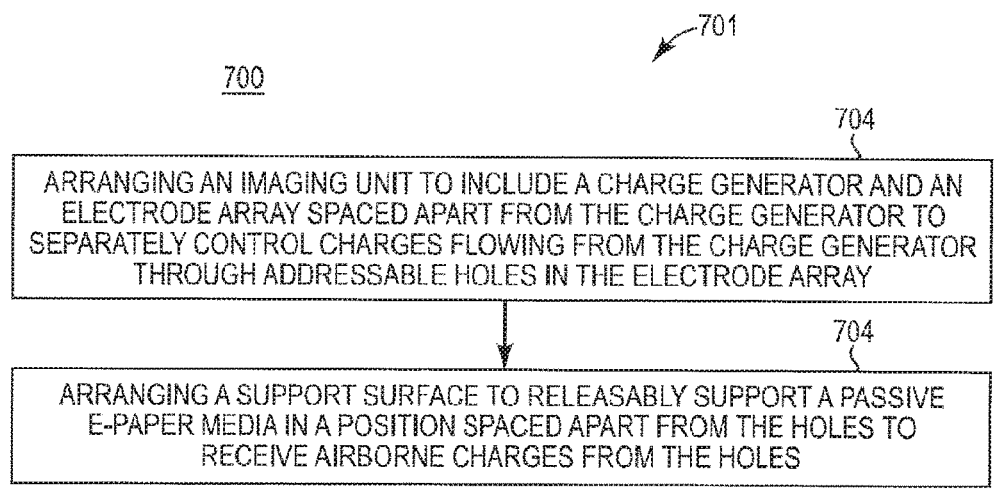
FIG. 12 is a flow chart diagram schematically illustrating a method of manufacturing an imaging device, according to one example of the present disclosure.

FIG. 12 is a flow chart diagram 700 illustrating in one example of the present disclosure a method 701 of manufacturing an imaging system. In one example, method 701 is performed using at least some of the components, assemblies, arrays, systems as previously described in association with at least FIGS. 1-11. In one example, method 701 is performed using at least some of the components, assemblies, arrays systems other than those previously described in association with at least FIGS. 1-11.

At 702, method 701 includes arranging an imaging unit to include a charge generator and an electrode array spaced apart from the charge generator to separately control charges flowing from the charge generator through addressable holes in the electrode array. The charges can be positive or negative charges that move under existing electrical fields. In one example, the charge generator is at least one corona generating device. In some examples, the corona generating device comprises a thin wire that is less than 100 micrometers in diameter and operating above its corona generating potential.

At 702, method 701 includes arranging a support surface to releasably support a passive e-paper media in a position spaced apart from the holes to receive airborne charges from the holes.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An e-paper imaging device, comprising:
   a writing unit including:
      a charge generator; and
      an electrode array spaced vertically below the charge generator and having individually addressable holes arranged in spaced apart rows including:
         a first set of rows generally centrally located below the charge generator; and a second set of rows including a first group of addressable holes and a second group of addressable holes with the first set of rows sandwiched between the first and second groups,
wherein the writing unit is to control the second set of rows of addressable holes independently of the first set of rows of addressable holes to account for a distance of the second set of rows relative to charge generator.

2. The device of claim 1, wherein the writing unit is to implement the independent control of the respective first and second set of rows via temporal and spatial control of the first set of rows independent of the second set of rows.

3. The device of claim 1, wherein the writing unit is to implement the independent control of the respective first and second set of rows via operating the first set of rows at a first electric potential between opposite sides of the electrode array, and via operating the second set of rows at a second electric potential different than the first electric potential.

4. The device of claim 1, wherein the spaced apart rows includes a third set of rows of individually addressable holes operable together independently of the first and second set of rows, the third set including a third group and a fourth group located on opposite sides of the second set of rows of holes, and the writing unit to control the third set of rows of addressable holes independently of the respective first and second sets of rows.

5. The device of claim 1, comprising:
a support surface to support a passive e-paper media in a position spaced apart from the electrode array to receive airborne charges from the writing unit during relative movement between the writing unit and the support surface.

6. The imaging device of claim 1, wherein the electrode array includes a dielectric material sandwiched between first electrodes and at least one second electrode, wherein the first and second electrical potentials occur between the first electrodes on a first side of a dielectric material and at least one second electrode on the second side of the dielectric material.

7. The imaging device of claim 6, wherein at least a portion of the electrode array comprises a flexible circuit.

8. The imaging device of claim 1, wherein the charge generator includes at least one corona wire extending in a first orientation, and wherein the rows of holes are spaced apart from each other by a minimum distance in a second orientation generally perpendicular to the first orientation, wherein the minimum distance is at least partially determined according to a minimum surface charge dissipation time.

9. An e-paper imaging device, comprising:
a writing unit including:
a charge generator including multiple spaced apart elongate corona wires extending generally parallel to each other; and
a non-charge-generating electrode array having individually addressable nozzles to separately control a flow of charges from the corona wires through the nozzles, wherein the nozzles are arranged in spaced apart rows extending generally parallel to each other and to the corona wires,
wherein the charge generator is spaced from the electrode array and wherein each corona wire extends generally parallel to the rows with the corona wires distributed uniformly relative to the rows of nozzles; and
a support surface to support a passive e-paper media in a position spaced apart from the electrode array to receive airborne charges from the writing unit.

10. The imaging device of claim 9, wherein each respective corona wire is located intermediate each adjacent pair of rows of nozzles.

11. The imaging device of claim 9, wherein the rows of nozzles are spaced apart from each other, in a direction generally transverse to the elongate corona wires, by a minimum distance, wherein the minimum distance is at least partially determinable according to a minimum surface charge dissipation time.

12. The imaging device of claim 9, wherein the electrode array is spaced vertically below the corona wires and the spaced apart rows of holes include:
a first set of rows generally centrally located below the charge generator and operable at a first electric potential between opposite sides of the electrode array; and
a second set of rows operable at a second electric potential different from the first electric potential, the second set including a first group and a second group with the first set of rows is sandwiched between the first and second groups.

13. An e-paper imaging device, comprising:
a writing unit including:
at least one corona wire extending in a first orientation; and
an electrode array spaced from the at least one corona wire and having individually addressable holes; and
a support surface to support a passive e-paper media in a position spaced apart from the electrode array to receive airborne charges from the at least one corona wire;
wherein the holes are arranged in multiple rows extending lengthwise in the first orientation, with the rows spaced apart from each other by a minimum distance in a second orientation generally perpendicular to the first orientation, the minimum distance at least partially determinable according to a minimum surface charge dissipation time.

14. The imaging device of claim 13, wherein the minimum distance is at least partially determinable according to a speed of relative movement in the second orientation between the writing unit and the support surface.

15. The imaging device of claim 13, wherein the electrode array is a non-charge-generating electrode array.

16. The imaging device of claim 13, wherein the multiple rows of holes define a two-dimensional array having a width generally matching a width of the passive e-paper media being imaged.

17. The imaging device of claim 13, wherein the electrode array includes:
a first dielectric film through which the holes extend from a first side of the dielectric film to an opposite second side of the dielectric film;
a first electrode layer on the first side; and
a second electrode layer on the second side, wherein electrical potential between the first electrode layer and the second electrode layer controls the flow of charges from the device through the holes in the dielectric film.

18. The imaging device of claim 17, wherein the first electrode layer is common to all of the addressable holes.

19. The imaging device of claim 13, wherein the electrode array comprises a flexible circuit structure.

20. The imaging device of claim 13, wherein the support surface is arranged to maintain the supported e-paper to be spaced apart from the electrode array by a distance of about 0.5 millimeters.

* * * * *